United States Patent [19]

Mansukhani

[11] 4,227,200

[45] Oct. 7, 1980

[54] PIGMENTED JET PRINTING AND PRODUCT

[75] Inventor: Ishwar R. Mansukhani, Neenah, Wis.

[73] Assignee: Whittaker Corporation, Los Angeles, Calif.

[21] Appl. No.: 950,245

[22] Filed: Oct. 10, 1978

[51] Int. Cl.$^3$ .............................................. G01D 15/18

[52] U.S. Cl. ......................................... 346/75; 346/1.1

[58] Field of Search ...................................... 346/1, 75

[56] References Cited

U.S. PATENT DOCUMENTS 4,095,233 6/1978 Goffe .................................. 346/1 X

*Primary Examiner*—George H. Miller, Jr.
*Attorney, Agent, or Firm*—Donald E. Nist; Henry M. Bissell; William E. Lloyd

[57] ABSTRACT

Ink compositions suitable for ink jet printing on metal, plastic, or paper surfaces, the ink characterized by opaque and visible properties in light, incorporating, in solution, a resin component, and at least one solvent, proportioned to give the ink as deposited a high degree of tackiness. The printing bears an overlying coating of at least one pigment.

According to another of its aspects, this invention is a process for information recording comprising producing a fine jet of liquid, directing the jet of liquid onto a recording medium while modulating the density of the applied jet by an electric field in accordance with the information to be recorded, thereby recording said information, affixing pigments to said recorded information, thereby rendering said information opaque and visible.

2 Claims, 1 Drawing Figure

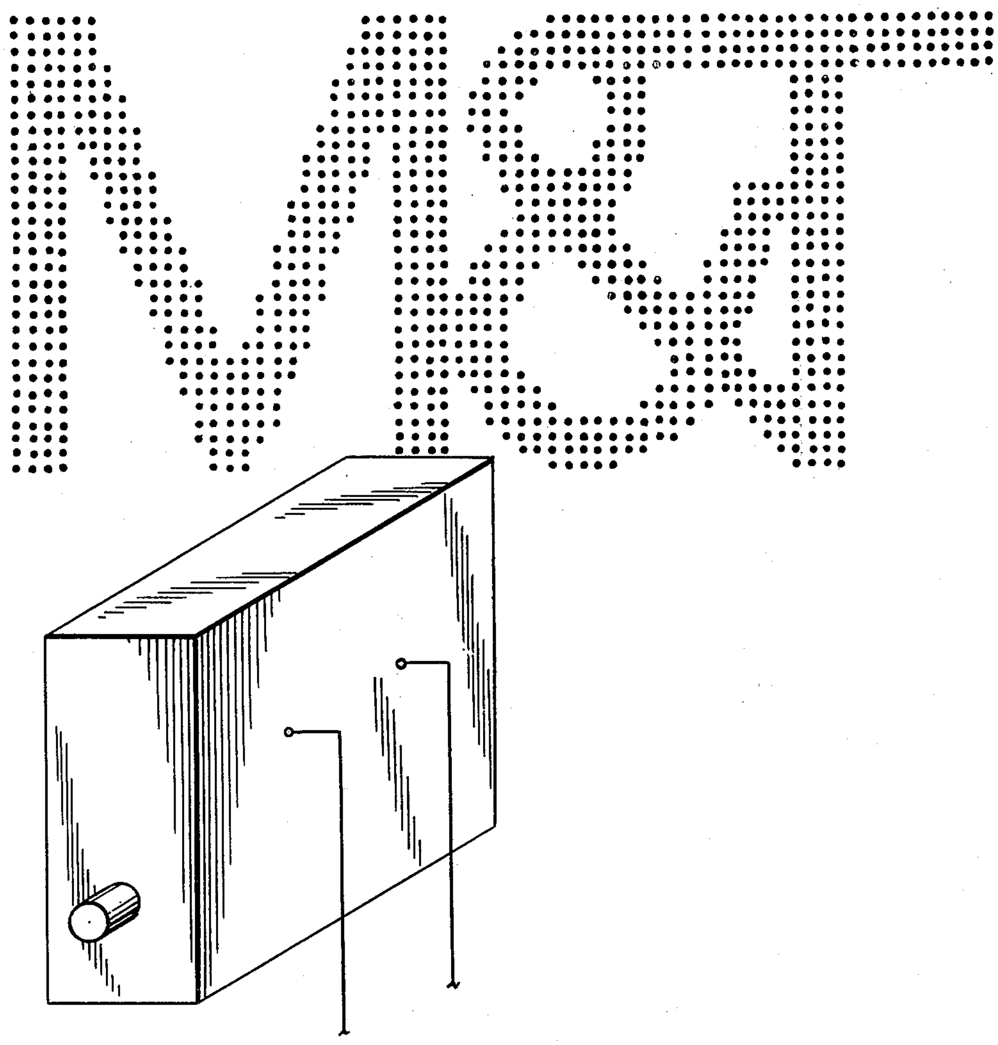
M&T

PIGMENTED JET PRINTING AND PRODUCT

BACKGROUND OF THE INVENTION

This invention relates to inks characterized by opaque properties in light. More specifically, this invention relates to recorded information, said recorded information exhibiting an overlying coating of at least one pigment.

Ink jet printing is a recent development in the art of applying identifying and decorative indicia to a base. In general terms, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to impinge to the base medium which is to receive the decorative or informative printed indicia. Apparatus suitable for carrying out the ink jet printing process is described in detail in U.S. Pat. Nos. 3,465,350 and 3,465,351, issued Sept. 2, 1969 and it is in connection with an apparatus and process such as are described in the aforementioned patents that the ink of the present invention is designed to function.

In order to operate satisfactorily in an ink jet printing system, an ink must display a consistent drop breakup length, drop velocity and drop charge under set operating conditions.

It has been determined that in an ink jet printer, such as those described in U.S. Pat. Nos. 3,465,350 and 3,465,351, inks with viscosity of 25 cps. will perform satisfactorily depending upon the type of nozzle used. However, inks with lower viscosities perform much better. Resistivity of ink may range as high as 10,000 ohm cm. for satisfactory operations.

DESCRIPTION OF THE INVENTION

This invention is a process for information recording comprising producing a fine jet of colored or colorless aqueous liquid, directing a jet of the liquid onto a recording medium, modulating the density of the applied jet by an electric field in accordance with the information to be recorded, thereby recording said information, applying to said recorded information a coating of at least one pigment, thereby rendering said recorded information opaque.

The FIGURE illustrates the method of the present invention.

A critical aspect of this invention is an overlying coating of at least one pigment for providing visibility of the printed indicia and opacity to said recorded information. The underlying ink has as a major component the solvent which provides fluidity to the ink and carries in solution or suspension the resin. The resin or binder remains tacky on the substrate surface after printing and serves to adhere and bind the overlying pigment in position on the substrate surface. In addition to these three components, various other ingredients may be utilized, including dispersing and wetting agents, plasticizers, diluents and the like.

Any coloring material capable of being comminuted is operable. The only limitation upon the coloring material or pigment is that it must be adaptable to being sprayed.

The coloring material may be affixed by any conventional means. Spraying is a preferred embodiment.

Inks of this invention contain resin/polymers in concentration of 1 to 80% alone or in blends, dissolved in solvents. Solvents include aliphatic alcohol and other solvents can be ketones, aldehydes, ethers, esters, glycols, glycol ethers, hydrocarbon, lactones. Typical aliphatic monovalent alcohols are methyl alcohol, ethyl alcohol, n-propyl alcohol, isopropyl alcohol, n-butyl alcohol, sec-butyl alcohol, tert-butyl alcohol, isobutyl alcohol, n-amyl alcohol, amyl alcohol, isoamyl alcohol, hexyl alcohol, heptyl alcohol, octyl alcohol, or a mixture of same. Aliphatic monovalent alcohols with 1 to 8 carbon atoms are particularly preferred.

Other solvents for these inks are ketones, aldehydes, ethers, esters, hydrocarbons, glycol, glycol ethers and lactones.

Suitable solvents are hydrocarbons, such as hexane, heptane, octane, decane, cyclopentane, cyclohexane, benzene, toluol, xylol, and ethylbenzene; hydrocarbon halides, such as carbon tetrachloride, ethylene dichloride, trichloroethylene, tectrachloroethane, and dichlorobenzene; ether-type solvents, such as butyl ether, ethylene glycol-diethyl ether, ethylene glycol-monoethyl ether, ethylene glycol-monobutyl ether; ketone-type solvents, such as acetone, methylethyl ketone, methyl propyl ketone, methyl isobutyl ketone, methylamyl ketone, cyclohexanone; ester-type solvents, such as ethyl formate, methyl acetate, propyl acetate, butyl acetate, phenyl acetate, ethylene glycol-monoethyl ether acetate, methylpropionate; other alcohol solvents, such as diacetone alcohol or such.

The ink in accordance with the invention also contains at least one resin. The resin component of a jet printing ink suitable for printing on coated or virgin metal must meet a variety of requirements. Of primary importance is the ability of the resin to adhere to the coated or virgin metal surface on which the ink is printed and to maintain this strong adhesion under widely varying conditions of humidity and temperature. When the ink is applied to the metal surface, it must be "wet" or adhere to a coated or virgin metal surface, even in the presence of some moisture, and must exhibit a high degree of tackiness, not only to maintain adhesion to the metal but also to adhere to the subsequently applied coloring material.

The resin component must also be very readily soluble in the solvent combination to form a stable, low viscosity solution so that effective amounts can be dissolved in the solvent without unduly increasing the viscosity of the composition.

Synthetic, semi-synthetic and natural resins, which is to say both polymerization as well as polycondensation and polyaddition products, are suitable. In principle, all resins customary in the printing ink and paint industry, such as are, for example, described in the lacquer raw material tables of Karstne (4th edition, Hanover, 1967) and in Wagner and Sarx's work on lacquer resins (4th edition, Munich, 1959) are used.

The following, for example, are suitable resins: colophony and derivatives thereof, hydrogenated colophony, di- or polymerized colophony, as calcium or zinc salt, with colophony esterified with mono- or polyvalent alcohols; with resinifiers such as acrylic acid and butane diol or maleic acid and pentaerythritol modified colophony resin; the soluble phenol resins modified with colophony and resins based on acrylic compounds, maleinate resins, oil-free alkyd resins, styrolated alkyd resins, vinyl tolene modified alkyd resins, alkyd resins with synthetic fatty acids, linseed oil alkyd resins, ricinene alkyd resins, castor oil alkyd resins, soy oil alkyd resins, coconut oil alkyd resins, tall oil and fish oil alkyd resins, acrylated alkyd resins, also oils and oil varnishes. Also suitable are terpene resins, polyvinyl resins such as polyvinyl acetate, polyvinyl chloride, polyvinylidene choloride, polyvinyl acetals, polyvinyl alcohol, polyvinyl ether, copolymers and graft polymers with various vinyl monomers, polyacrylic resins, acrylate resins, polystyrenes, polyisobutylenes, polyesters based on phthalic acid, maleic acid, adipic acid, sebacic acid, etc.; naphthalene formaldehyde resins, furane resins, ketone resins, aldehyde resins, polyurethanes (especially urethane primary-products that cure only at elevated temperature), epoxide resins (especially resin-curer mixtures that cure only at elevated temperature) and precondensates thereof. Suitable too are primary products of unsaturated polyester resins, dialkylphthalate-prepolymers, polyolefines such as polyethylene wax or polypropylene wax, indene and cumaronindene resins, carbamide and sulphonamide resins, polyamide and polyester resins, silicone resins, rubber and derivatives thereof, for example, cyclorubber and chlorinated rubber, chiefly, however, cellulose derivatives such as cellulose esters (nitrocellulose, cellulose acetate and the like), and especially cellulose ethers, for example, methylcellulose, hydroxyethylcellulose, hydroxypropylcellulose, propionitrile cellulose, ethyl cellulose and benzylcellulose. The corresponding derivatives of other polysaccharides can also be used.

While there are disclosed below but a limited number of embodiments of the invention herein presented, it is possible to produce still other embodiments without departing from the inventive concepts herein disclosed. Various other modifications will be readily apparent to those skilled in the art.

| Example 1 | Parts by Weight |
|---|---|
| non-oxidizing polyester exhibiting a viscosity of S-X on the Gardner-Holdt scale and a melting point of 75°-85° C. sold as Arochem 650 by Ashland Chemical Company, Columbus, Ohio | 41.40 |
| methyl ethyl ketone | 15.00 |
| methanol | 64.30 |
| rhodamine B base | 3.00 |
| raw castor oil | 15.00 |
| para toluene sulfonic acid | 1.30 |
| | 140.00 |

-continued

A 60% solution of Arochem 650, a water-white non-oxidizing polyester resin, in methanol exhibited viscosity of less than 25 centipoises.
A jet ink was formulated using above resin which was slow drying by using high boiling ketones and alcohols. A pigment of required color is sprayed over the printed tacky ink. The pigment adhered only to the tacky, prior printed jet ink, providing opacity and eliminating the surface tack.

| Example 2 | Parts by Weight |
|---|---|
| arochem 650 | 41.40 |
| methanol | 41.40 |
| MEK | 16.00 |
| PTSA | 1.20 |
| cyclohexanone | 15.00 |
| | 115.00 |

A 60% solution of Arochem, a water-white nonoxidizing polyester resin, in methanol exhibited viscosity of less than 25 centipoises.
A jet ink was formulated using above resin which was slow dyring by using high boiling ketones and alcohols. A pigment of required color is sprayed over the printed tacky ink. The pigment adhered only to the tacky, prior printed jet ink, Providing opacity and eliminating the surface tack.

Various other examples and modifications of the ink compositions of this invention might be cited or will suggest themselves to those skilled in the art, and it is intended that the scope of the invention be limited only as necessitated by the appended claims.

What is claimed is:

1. A process for information recording comprising producing a fine jet of high solids liquid containing resin, modulating the charge density of the jet by applying an electric field in accordance with the information to be recorded, directing the jet of liquid to a recording medium to record said information, while said information is still in a tacky state applying a finely divided pigment under pressure of from 1 to 90 pounds per square inch for from 1 to 95 seconds to said recorded information, thereby binding said pigment to said resin and rendering said information opaque.

2. The process of claim 1 wherein said finely divided pigment is sprayed.

* * * * *